United States Patent
Luukko et al.

(10) Patent No.: US 7,190,601 B2
(45) Date of Patent: Mar. 13, 2007

(54) PULSE-WIDTH MODULATION METHOD FOR A FREQUENCY CONVERTER

(75) Inventors: Julius Luukko, Lappeenranta (FI); Hannu Saren, Lappeenranta (FI)

(73) Assignee: Vacon Oyj, Vaasa (FI)

( * ) Notice: Subject to any disclaimer, the term of this patent is extended or adjusted under 35 U.S.C. 154(b) by 91 days.

(21) Appl. No.: 10/925,967

(22) Filed: Aug. 26, 2004

(65) Prior Publication Data
US 2005/0046508 A1 Mar. 3, 2005

(30) Foreign Application Priority Data
Aug. 28, 2003 (FI) .................................. 20031208

(51) Int. Cl.
*H02M 7/5387* (2006.01)
(52) U.S. Cl. .................... 363/132; 363/98; 363/69; 318/768; 318/800
(58) Field of Classification Search .......... 363/34–44, 363/95, 51–57, 85, 135, 136, 98; 318/801, 318/811, 767, 700, 530–536
See application file for complete search history.

(56) References Cited

U.S. PATENT DOCUMENTS 5,428,283 A * 6/1995 Kalman et al. ............. 318/729
6,069,808 A * 5/2000 Panahi et al. ............... 363/98
6,956,352 B2 * 10/2005 Tarkiainen et al. ......... 318/800
2002/0044472 A1 4/2002 Arnet et al.

FOREIGN PATENT DOCUMENTS

| EP | 0 371 442 B1 | 2/1995 |
| EP | 0 467 694 B1 | 9/1997 |
| EP | 1 081 842 A1 | 3/2001 |
| EP | 1081842 A1 * | 3/2001 |

\* cited by examiner

*Primary Examiner*—Rajnikant B. Patel
(74) *Attorney, Agent, or Firm*—Birch, Stewart, Kolasch & Birch, LLP

(57) ABSTRACT

A space-vector pulse-width modulation method for a frequency converter provided with a voltage intermediate circuit, said frequency converter comprising a mains bridge (10) to be connected to an alternating current source ($U_U$, $U_V$, $U_W$), a direct-voltage intermediate circuit and a controlled load bridge (11) for supplying a variable-frequency alternating voltage ($U_S$, $U_R$, $U_T$) to a load (12), and in which method the modulator performing the modulation is given a reference. The load bridge modulator is given a reference consisting of the references for the flux linkage changes produced by the voltage vectors, the flux linkage change is calculated on the basis of measured intermediate-circuit voltage, and the currently active voltage vector is kept turned on until the reference value is reached.

6 Claims, 2 Drawing Sheets

PULSE-WIDTH MODULATION METHOD FOR A FREQUENCY CONVERTER

This Non-provisional application claims priority under 35 U.S.C. §119(a) on Patent Application No(s). 20031208 filed in Finland on Aug. 28, 2003, the entire contents of which are hereby incorporated by reference.

BACKGROUND OF THE INVENTION

1. Field of the Invention

The present invention relates to a space-vector pulse-width modulation method for a use in a frequency converter. In particular, the invention relates to a space-vector pulse-width modulation method for a frequency converter provided with a voltage intermediate circuit. The invention also relates to a voltage-controlled frequency converter controllable by a space-vector pulse-width modulation method.

2. Discussion of the Background

Space-vector pulse-width modulation (Space vector PWM, SVPWM) is a pulse-width modulation method for a frequency converter provided with a voltage intermediate circuit that is particularly well suited for digital implementation. In the modulation method, the on-time is generally calculated beforehand for two output voltage vectors of the frequency converter (i.e. for two software positions in the inverter bridge of the frequency converter) by software, from which the requested output voltage space vector is generated as an average. A control system containing a digital counter then takes care of changing the switch positions so that these two switch positions are on for the calculated times in question. The times are calculated by using the output voltage space vector as an input variable.

In the calculation of the on-times of the switch positions in question, the intermediate circuit voltage is assumed to be constant. This assumption holds good in the case of an intermediate circuit designed to so-called traditional ratings. If for some reason the intermediate circuit voltage undergoes a considerable change during a switching period, then the modulation method will be unable to implement the requested average output voltage space vector.

In the following, prior-art space-vector PWM, which is described e.g. in reference H. van der Broeck, H. Skudelny, and G. Stanke, "Analysis and realization of a pulse width modulator based on voltage space vectors", in IEEE-IAS Conf. Records, pages 244–251, Denver, USA, 1986, will be referred to as traditional space vector PWM or SVPWM for short. The input variable in SVPWM is an output voltage reference, which can be divided into real and imaginary components $$U_{s,ref} = U_x + jU_y \qquad (1)$$

The inverter output voltage can be expressed as a space vector $$U_{s,out}(sA, sB, sC) = \frac{2}{3}U_{DC}(sA + sB \cdot e^{j2\pi/3} + sC \cdot e^{j4\pi/3}) \qquad (2)$$

where s{A,B,C} is 1 if the phase {A,B,C} is connected to the upper arm of the inverter and 0 if the phase is connected to the lower arm. In different combinations, 6 active voltage vectors and two so-called zero vectors (all phases connected to the same arm) are obtained. The directions of the active voltage vectors in the complex plane are 0, 60, 120, 180, 240 and 300 degrees.

As shown in FIG. 1, the complex plane is divided into six equal sectors, with the first sector starting from the real axis. The direction of the real axis corresponds to the direction of the magnetic axis of the A phase of the stator of a three-phase motor connected to the inverter, direction 120 degrees corresponds to the direction of the magnetic axis of the B phase of the motor and 240 degrees to the direction of the C phase. The active voltage vectors form the borders between these sectors.

It is now possible in any sector m to produce any average voltage vector (of limited magnitude, however) by using the voltage vectors $V_m$ and $V_{m+1}$ at the sector borders for time $T_m$ and $T_{m+1}$. Space vector PWM implements such a voltage vector when the voltage reference is $U_{s,ref}$.

$$U_{s,ref} = \frac{T_m}{T_s}V_m + \frac{T_{m+1}}{T_s}V_{m+1}, \qquad (3)$$

$T_s$ is the sampling period, i.e. the update interval of the voltage reference. The voltage vectors $V_m$ and $V_{m+1}$ at the borders of the sector m can be defined by equations $$V_m = \frac{2}{3}U_{DC}e^{j\frac{\pi}{3}(m-1)} \qquad (4)$$

$$V_{m+1} = \frac{2}{3}U_{DC}e^{j\frac{\pi}{3}(m)}.$$

From equations (3) and (4), it is possible to calculate the times $T_m$ and $T_{m+1}$ for the counter $$\begin{bmatrix} T_m \\ T_{m+1} \end{bmatrix} = \frac{\sqrt{3}T_s}{U_{DC}} \begin{bmatrix} \sin(\frac{\pi}{3}m) & -\cos(\frac{\pi}{3}m) \\ -\sin(\frac{\pi}{3}(m-1)) & \cos(\frac{\pi}{3}(m-1)) \end{bmatrix} \begin{bmatrix} U_x \\ U_y \end{bmatrix}. \qquad (5)$$

For the remaining time of the switching period $T_s$, the zero vector is used $$T_0 = T_s - T_m - T_{m+1}$$

SVPWM can be implemented as a so-called symmetric method. In that case, the zero vector is used at the beginning, middle and end of the switching period, and the active voltage vectors $V_m$ and $V_{m+1}$ are divided into two parts. Symmetric implementation provides the advantage of a lower harmonics content.

SUMMARY OF THE INVENTION

The object of the present invention is to create a new modulation method, so-called differential space-vector pulse-width modulation (DSVPWM), which takes a changing intermediate circuit voltage into account in such manner that the flux linkage change produced by the switch combinations is the same as would be produced by a constant intermediate circuit voltage with space vector PWM. In this way, the requested average output voltage space vector is achieved.

The new modulation method is based on converting a voltage reference into a flux linkage change reference. Instead of turn-on times of the voltage vectors, the modulator is given a reference for the flux linkage changes produced by the voltage vectors. The modulator then calculates the flux linkage change on the basis of the measured intermediate circuit voltage and keeps the currently active voltage vector turned on until the reference value is reached.

BRIEF DESCRIPTION OF THE DRAWINGS

In the following, the invention will be described in detail with reference to an example and the attached drawings, wherein FIG. 1. Division of the complex plane into 60° sectors, with the voltage vectors forming the borders between sectors.

DETAILED DESCRIPTION OF THE PREFERRED EMBODIMENTS

Figure 6:
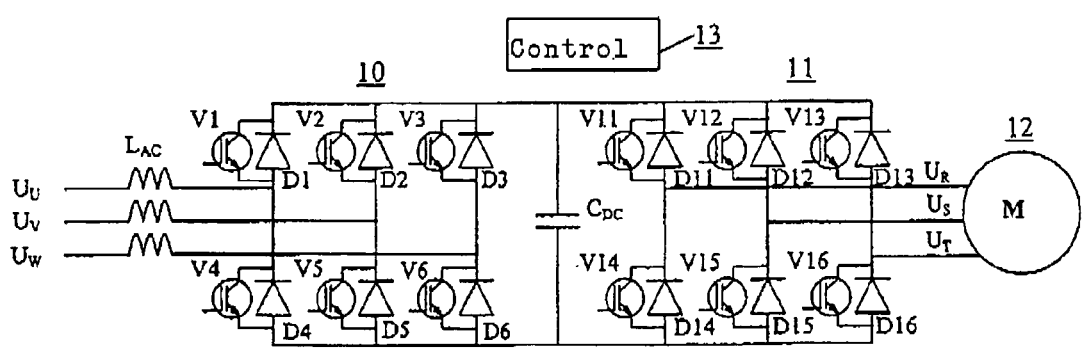
FIG. 6. Frequency converter provided with a controlled mains bridge.

FIG. 6 presents a three-phase voltage-controlled frequency converter with an AC inductor $L_{AC}$ for limiting mains current harmonics, a mains bridge 10 (rectifier) for rectifying the three-phase alternating voltage of a supply network having phase voltages $U_U$, $U_V$, $U_W$ to produce the direct voltage $U_{DC}$ of a DC intermediate circuit, and a load bridge (inverter) 11 for inverting the direct voltage of the DC intermediate circuit to produce a variable-frequency three-phase alternating voltage consisting of phase voltages $U_R$, $U_S$, $U_T$. The frequency converter feeds a three-phase motor (M) 12. The load bridge 11 is a full-wave bridge with a control unit 13 controlling the semiconductor switches V11–V16 of each phase and with zero diodes D11–D16 connected in inverse-parallel with the switches. The mains bridge 10 may be a controlled full-wave bridge according to the example in FIG. 6, having in each arm of the bridge controllable semiconductor switches V1–V6, such as IGBTs, and zero diodes 01–D6 connected in inverse-parallel with these, so that power can flow from the mains to the load and also from the load to the mains e.g. when the motor is braking. The mains bridge 10 may also be a non-controlled circuit with no controlled semiconductor switches, in which case power can only flow from the mains to the load.

If the intermediate circuit voltage $U_{DC}$ remains constant during the turn-on times, then the flux linkage of the motor will change $$\Delta\psi = T_m V_m + T_{m+1} V_{m+1}$$

The new modulation method DSVPWM is thus based on converting the voltage reference into a flux linkage change reference. Instead of turn-on times of the voltage vectors, the modulator is given references for the flux linkage changes produced by the voltage vectors. The modulator then calculates the flux linkage change on the basis of the measured intermediate circuit voltage and keeps the currently active voltage vector turned on until the reference value is reached.

The reference value of flux linkage change is obtained by partly multiplying equation (3) by the sampling period $T_s$:

$$U_{s,ref} T_s = T_m V_m + T_{m+1} V_{m+1}$$

$$\Delta\psi_{s,ref} = \Delta\psi_m + \Delta\psi_{m+1} \qquad (6)$$

Now, terms $T_m V_m = \Delta\psi_m$ and $T_{m+1} V_{m+1} = \Delta\psi_{m+1}$ are the flux linkage changes that the voltage vectors $V_m$ and $V_{m+1}$ should produce as they are acting on the machine. Thus, $\Delta\psi_m$ and $\Delta\psi_{m+1}$ are the reference values for the flux linkage changes. Since the equation for $T_m$ and $T_{m+1}$ was already solved above into equation (4), the equation for $\Delta\psi_m$ and $\Delta\psi_{m+1}$ will be obtained by multiplying (4) with the matrix diag([$V_m$ $V_{m+1}$]) from the right. After simplification, we obtain $$\begin{bmatrix} \Delta\psi_{m,ref} \\ \Delta\psi_{m+1,ref} \end{bmatrix} = \qquad (7)$$

$$\frac{2T_s}{\sqrt{3}} \begin{bmatrix} \sin(\frac{\pi}{3}m) & -\cos(\frac{\pi}{3}m) \\ -\sin(\frac{\pi}{3}(m-1)) & \cos(\frac{\pi}{3}(m-1)) \end{bmatrix} \begin{bmatrix} U_x e^{j\pi(m-1)/3} \\ U_y e^{j\pi m/3} \end{bmatrix}.$$

Figure 1:
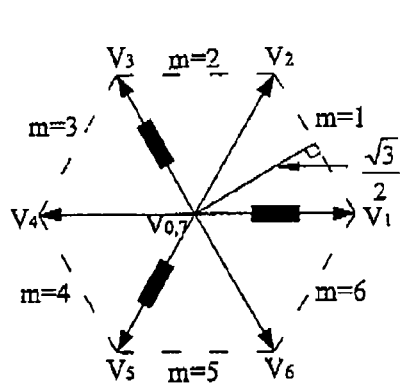
Figure 2:
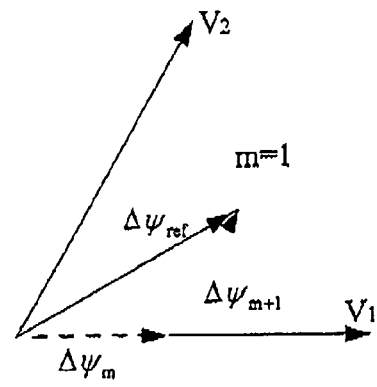
FIG. 2. Voltage vector $V_1$ produces flux linkage change $\Delta\psi_1$ and voltage vector $V_2$ produces flux linkage change $\Delta\psi_2$.

The idea of the flux linkage change reference can be understood from the attached FIG. 2, which illustrates the way in which the flux linkage change is produced in sector m=1. In the figure, the flux linkage change reference is $\Delta\psi_{ref}$. With voltage vector $V_m = V_1$, flux linkage change $\Delta\psi_1$ has to be produced, and with voltage vector $V_{m+1} = V_2$, flux linkage change $\Delta\psi_2$ has to be produced. The transition between voltage vectors takes place when the actual value reaches the reference.

The actual value of flux linkage change for comparison with the reference is obtained by calculating the time integral of the inverter output voltage during the turn-on period $$\Delta\psi_{m,calc} = \int V_m dt = \int \frac{2}{3} U_{DC,meas} e^{j\frac{\pi}{3}(m-1)} dt, \qquad (8)$$

kun $V_m$ on aktiivinen $$\Delta\psi_{m+1,calc} = \int V_{m+1} dt = \int \frac{2}{3} U_{DC,meas} e^{j\frac{\pi}{3}(m)} dt,$$

kun $V_{m+1}$ on aktiivinen where $U_{DC,meas}$ is the measured intermediate circuit voltage.

The flux linkage change $\Delta\psi_{m,calc}$ is only calculated when $V_m$ is active. Although $V_{m+1}$ also produces a component in the direction of $V_m$, it is not taken into account in the calculation of $\Delta\psi_{m,calc}$. Neither is the component produced by $V_m$ in the direction of $V_{m+1}$ taken into account in the calculation of $\Delta\psi_{m+1,calc}$. The voltage vector is changed from $V_m$ to $V_{m+1}$ (i.e. the position of the switches of the inverter is changed) when the actual value $\Delta\psi_{m,calc}$ reaches the reference $\Delta\psi_{m,ref}$.

It is to be noted that the complex exponential function appearing in both the reference and the actual value has an absolute value of unity. Therefore, it is possible to consider only the absolute value in both the reference and the actual value and omit the multiplication by the complex exponential function in the implementation of both. A further advantageous observation is that if the equations for both the reference and the actual value are multiplied by 3/2, one multiplication operation will be left out from the calculation of the actual value and in the calculation of the reference value the coefficient will be $T_s\sqrt{3}$.

Figure 3:
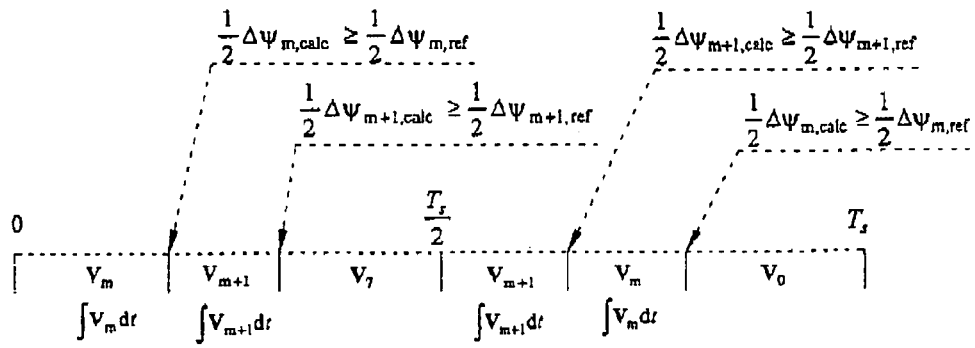
FIG. 3. DSVPWM implemented as a (quasi)symmetric method.

Like SVPWM, DSVPWM can also be implemented as a (quasi)symmetric method. In a symmetric implementation, the first voltage vector $V_m$ is turned on at the beginning of the switching period. $V_m$ is kept turned on until the flux linkage change equals half the reference $\Delta\psi_{m,ref}$. After this, the second voltage vector $V_{m+1}$ is applied and it is kept turned on until the flux linkage change produced by it equals half the reference $\Delta\psi_{m,ref}$. After this, the zero voltage vector $V_7$ is turned on until time $T_s/2$ has elapsed from the beginning of the switching period. Upon the lapse of $T_s/2$, $V_{m+1}$ is turned on until the remaining half of reference m for flux linkage change has been fulfilled. After that, $V_m$ is turned on and applied until the remaining half of reference $\Delta\psi_{m,ref}$ for flux linkage change has been fulfilled. If there is still time left over before $T_s$, then the zero vector $V_0$ is additionally turned on. This sequence is illustrated in the attached FIG. 3.

Figure 4:
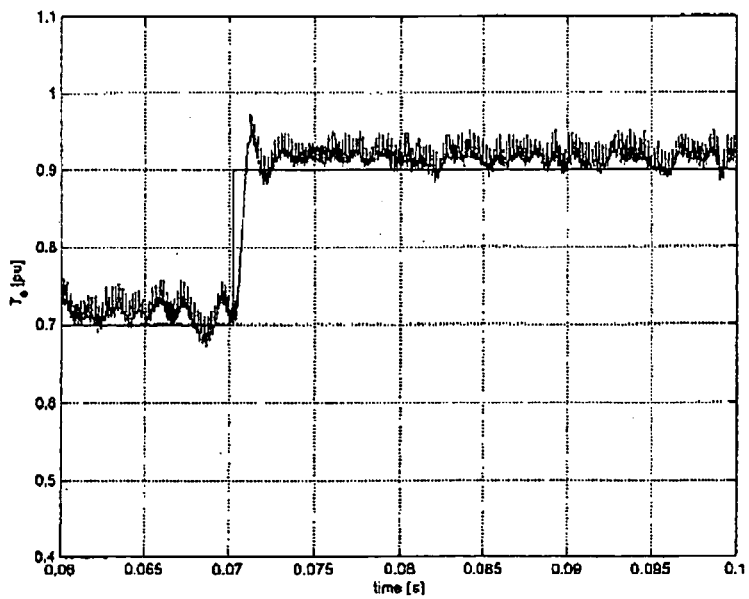
FIG. 4. Torque produced by a motor provided with a DSVPWM modulator.
Figure 5:
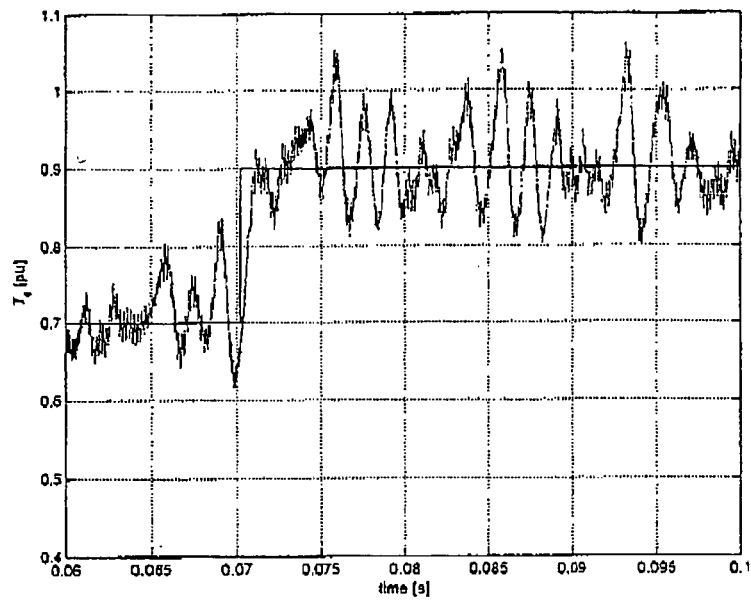
FIG. 5. Torque produced by a motor provided with a SVPWM modulator.

Presented in the attachment is a comparison between the performances of SVPWM and the described DSVPWM. FIGS. 4 and 5 represent the torque produced by the motor. The results have been obtained by simulating the operation of a motor drive with both modulation methods so that in both cases the voltage references for both control methods are generated by current vector control. The simulations were performed using a low-capacitance intermediate circuit, so a constant intermediate circuit assumption can no longer be used with a good accuracy. In other respects, the same boundary conditions were applied in the simulations. Thus, the only difference between the two situations is the modulation method. A high value of the inertial mass of the rotor of the motor was used, so the rotational speed could not vary from its set value, which was 0.7 pu.

It can be seen from FIGS. 4 and 5 that the torque produced by SVPWM oscillates badly, whereas DSVPWM is able to produce a more even torque.

Although the example presented above describes the application of the disclosed new modulation method to the modulation of the voltage to be supplied to a motor, the method can also be applied to the modulation of the voltage of a controlled mains bridge. In this case, instead of being converted into a reference for the flux linkage change of the motor, the voltage reference is converted into an imaginary reference for the flux linkage change of the inductor ($L_{AC}$, FIG. 6) connected between the power supply mains and the bridge. The modulation method now produces at the mains bridge input voltage connection exactly the requested voltage regardless of variations of the intermediate circuit voltage.

It is obvious to the person skilled in the art that different embodiments of the invention are not limited to the example described above, but that they may be varied within the scope of the claims presented below.

The invention claimed is:

1. A method for space-vector pulse-width modulating a frequency converter, said frequency converter having a mains bridge connected to an alternating current source, a direct-voltage intermediate circuit and a controlled load bridge supplying a variable-frequency alternating voltage to a load, said method comprising the steps of:
   producing references for flux linkage changes produced by the voltage vectors;
   giving said references to the modulator of the load bridge;
   calculating the flux linkage change on the basis of measured intermediate-circuit voltage; and
   maintaining the currently active voltage vector until a reference value is reached.

2. A method for space-vector pulse-width modulating a frequency converter, said frequency converter having a mains bridge connected to an alternating current source, a direct-voltage intermediate circuit and a controlled load bridge supplying a variable-frequency alternating voltage to a load, said method comprising the steps of:
   producing references for flux linkage changes produced by the voltage vectors;
   giving said references to the modulator of the load bridge;
   calculating the flux linkage change on the basis of measured intermediate-circuit voltage;
   maintaining the currently active voltage vector until a reference value is reached;
   wherein a first voltage vector is turned on and maintained in the turned-on state until the flux linkage change equals one half of the reference for a first sector, whereupon a second voltage vector is turned on and maintained in a turned on state until the flux linkage change produced thereby equals one half of the reference for a second sector, whereupon a zero voltage vector is turned on until a time corresponding to half the duration of the switching period has elapsed from the beginning of the switching period, whereupon the second voltage vector is turned on until the remaining half of the reference of the second sector for flux linkage change has been fulfilled, whereupon the first voltage vector is again turned on and applied until the remaining half of the reference for the first sector for flux linkage change has been fulfilled, whereupon if any time of the switching period still remains, the zero voltage vector is turned on until the end of the switching period.

3. The method according to claim 2, wherein the mains bridge is a controlled bridge, and wherein the mains bridge is controlled using a corresponding differential space-vector pulse-width modulation method, the mains bridge modulator being given a reference value consisting of imaginary references for the flux linkage change of an inductor connected between the alternating current source and the mains bridge.

4. A frequency converter, comprising:
   a mains bridge connected to an alternating current source;
   a direct-voltage intermediate circuit;
   a controlled load bridge for supplying a variable-frequency alternating voltage to a load;
   a control unit having a modulator, said load bridge being controlled by space-vector
   pulse-width modulation by said modulator;
   wherein the reference for the mains bridge modulator in the control unit includes references for the flux linkage changes produced by the voltage vectors, the modulator calculating the flux linkage change on the basis of measured intermediate-circuit voltage and maintaining the currently active voltage vector in a turned on state until the reference value is reached.

5. A frequency converter, comprising:
   a mains bridge connected to an alternating current source;
   a direct-voltage intermediate circuit;
   a controlled load bridge for supplying a variable-frequency alternating voltage to a load;
   a control unit having a modulator, said load bridge being controlled by space-vector
   pulse-width modulation by said modulator;
   wherein the reference for the mains bridge modulator in the control unit includes references for the flux linkage changes produced by the voltage vectors, the modulator calculating the flux linkage change on the basis of measured intermediate-circuit voltage and maintaining the currently active voltage vector in a turned on state until the reference value is reached;

wherein the modulator turns on a first voltage vector, which is maintained in a turned-on state until the flux linkage change equals half of the reference for a first sector, whereupon the modulator changes to a second voltage vector, which is maintained in a turned-on state until the flux linkage change produced thereby equals half of the reference for the second sector, whereupon the modulator turns on a zero voltage vector until a time corresponding to half the duration of the switching period has elapsed from the beginning of the switching period, whereupon the modulator turns on the second voltage vector until the remaining half of reference for the first sector for the flux linkage change has been fulfilled, whereupon the modulator again turns on the first voltage vector; which is applied until the remaining half of reference for the first sector for flux linkage change has been fulfilled, whereupon if any time of the switching period still remains, the modulator turns on the zero voltage vector until the end of the switching period.

6. The frequency converter according to claim 5, wherein the mains bridge is a controlled bridge; and wherein the modulator of the mains bridge controls the mains bridge by a corresponding differential space-vector pulse-width modulation method, wherein the reference value for the mains bridge modulator consists of imaginary references for the flux linkage change of an inductor connected between the alternating current source and the mains bridge.

* * * * *